United States Patent
Belhadj et al.

(10) Patent No.: US 6,516,425 B1
(45) Date of Patent: Feb. 4, 2003

(54) RAID REBUILD USING MOST VULNERABLE DATA REDUNDANCY SCHEME FIRST

(75) Inventors: Mohamed Belhadj, Eagle, ID (US); Rodger D. Daniels, Boise, ID (US); David K. Umberger, Boise, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/430,403

(22) Filed: Oct. 29, 1999

(51) Int. Cl.$^7$ .............................. G06F 11/00
(52) U.S. Cl. ............................ 714/6; 714/15
(58) Field of Search ................... 714/6, 15, 5, 7; 711/114

(56) References Cited

U.S. PATENT DOCUMENTS

| | | | | |
|---|---|---|---|---|
| 5,522,031 A | * | 5/1996 | Ellis et al. | 714/6 |
| 5,701,407 A | * | 12/1997 | Matsumoto et al. | 714/7 |
| 6,000,039 A | * | 12/1999 | Tanaka et al. | 714/2 |
| RE36,846 E | * | 8/2000 | Ng et al. | 714/6 |
| 6,223,300 B1 | * | 4/2001 | Gotoh | 711/114 |
| 2002/0059539 A1 | * | 5/2002 | Anderson | 714/6 |

* cited by examiner

Primary Examiner—Robert Beausoliel
Assistant Examiner—Marc Duncan
(74) Attorney, Agent, or Firm—Lane R. Simmons (57) ABSTRACT

A method of managing data in a hierarchical data storage system employing data redundancy schemes includes prioritizing a data rebuild based on a most vulnerable data redundancy scheme in the storage system. A data storage system embodying this rebuild prioritization method is also described. Prioritizing the data rebuild includes enabling a rebuild of the most vulnerable data redundancy scheme prior to enabling a rebuild of any other data redundancy scheme in the system. The most vulnerable data redundancy scheme is determined by comparing a probability of losing data that can be prevented by a rebuild for each data redundancy scheme with respect to the potential for one or more next storage device failures in the data storage system. The probability of losing data for each data redundancy scheme is determined by considering characteristics associated with the storage system and disk drives in the storage system, including number of storage devices, mean time between failure, mean time or calculated time to rebuild, and failure dependencies.

24 Claims, 3 Drawing Sheets

RAID REBUILD USING MOST VULNERABLE DATA REDUNDANCY SCHEME FIRST

FIELD OF THE INVENTION

This invention relates in general to computer mass storage systems and, more particularly, to prioritizing data rebuild in the event of a disk failure in a hierarchical system utilizing a Redundant Array of Independent Disks (RAID).

BACKGROUND OF THE INVENTION

Conventional disk array data storage systems have multiple disk storage devices that are arranged and coordinated to form a single mass storage system. A Redundant Array of Independent Disks (RAID) system is an organization of data in an array of mass data storage devices, such as hard disk drives, to achieve varying levels of data availability and system performance. Data availability refers to the ability of the RAID system to read and write data in the array of data storage devices even in the event of a failure of one or more of the individual data storage devices or components in the array. A measurement of system performance is the rate at which data can be sent to or received from the RAID system.

Data availability is often provided through the use of redundancy schemes where data, or relationships among data, are stored in multiple locations on the storage system. In the event of a disk or component failure, redundant data is retrieved from the operable portion of the system and used to regenerate the original data that is lost due to the failure. There are two common methods for storing redundant data: mirror and parity. In mirror redundancy, data is duplicated and stored in two or more separate areas of the storage system. In parity redundancy, redundant data is stored in one or more areas of the storage system, but the size of the redundant storage area is less than the storage space used to store the original data.

RAID systems typically designate part of the physical storage capacity in the array to store redundant data, either mirror or parity. The redundant information enables regeneration of user data in the event that one or more of the array's member disks, components, or the access paths to the disk(s) fail. Typically, the disks are divided into equally sized address areas referred to as "blocks." A set of blocks that has the same unit address ranges from each disk is referred to as a "stripe" or "stripe set." A set (or subset) of disks in the array over which a stripe or stripe set spans is referred to as a redundancy group. Traditionally, RAID arrays employ one or more redundancy groups and a single redundancy scheme for each redundancy group, although the schemes may vary among the redundancy groups. However, as will be discussed subsequently herein, hierarchical RAID arrays employ one or more redundancy schemes (i.e., RAID levels) for each redundancy group in an array.

From a data management and data redundancy perspective, RAID levels are typically characterized as one of six architectures, or redundancy schemes, enumerated as RAID levels 1–6. Although other RAID levels exist, levels 1–6 are the most commonly used and will be discussed herein with respect to the present invention. However, it should be noted that the present invention is applicable to any RAID level or data redundancy scheme.

The use of disk mirroring is referred to as RAID Level 1, where original data is stored on one set of disks and a duplicate copy of the data is kept on separate disks. The use of parity checking is referred to as RAID Levels 2, 3, 4, 5, and 6. In general, although RAID 1 provides higher data reliability and may provide the best small-write input/output (I/O) performance over RAID Levels 2, 3, 4 and 5, it uses the most storage space because all data is duplicated. In contrast, RAID Levels 2–5 provide a lesser amount of data reliability (relative to RAID 1) and, typically, reduced small-write performance. However, they don't consume as much disk space as a RAID 1 technique because data is not duplicated but rather interleaved and parity checked across the disk array in a stripe set. A parity stripe set interleaves data and redundant (parity) data on multiple member disks. The parity stripe set presents a single virtual disk whose user data capacity is approximately the sum of the capacities of its members, less the storage used for holding the parity (redundant) data of the user data. For RAID levels 3–5, parity is commonly calculated using a bit by bit Exclusive OR function of corresponding data chunks in a stripe set from all of the data disks. This corresponds to a one equation, one unknown, sum of products calculation. The mirror set in a RAID 1 architecture presents a single virtual disk whose user data capacity is the sum of the capacity of one-half of its members, the other half holding the mirrored (redundant) data of the user data.

In addition to RAID mirror level 1, RAID parity levels 4, 5 and 6 are of particular interest for the present discussion. Specifically, for example, a RAID 4 uses a stripe set or redundancy group and a single dedicated parity disk to store redundant information about the data existing on the other data disks in the stripe set or redundancy group. Segments of data from each virtual disk sector are distributed across corresponding sectors of all but one of the stripe set members (i.e., the parity disk), and the parity of the distributed segments is written in the corresponding sector of the parity disk.

Because a RAID 4 system stores all parity blocks on a single unit in the stripe set, the single unit containing the parity blocks is accessed disproportionately relative to the other data storage devices in the stripe set or redundancy group. To eliminate the resulting constriction of data flow in a RAID 4 system, a RAID 5 architecture distributes the parity blocks across all of the data storage devices in the stripe set or redundancy group. Typically in a RAID 5 system, a set of N+1 data storage devices forms the stripe set or redundancy group. Each stripe has N blocks of data and one block of parity data. The block of parity data is stored in one of the N+1 data storage devices. The parity blocks corresponding to the remaining stripes of the stripe set or redundancy group are stored across the data storage devices within the stripe set or redundancy group. For example, in a RAID 5 system using five data storage devices in a given stripe set or redundancy group, the parity block for the first stripe of blocks may be written to the fifth device; the parity block for the second stripe of blocks may be written to the fourth device; the parity block for the third stripe of blocks may be written to the third device; etc. Typically, the location of the parity block for succeeding blocks shifts to the succeeding logical device in the stripe set or redundancy group, although other patterns may be used.

A RAID 6 architecture is similar to RAID 4 and 5 in that data is striped, but is dissimilar in that it utilizes two independent and distinct parity values for the original data, referred to here as P & Q. The P parity is commonly calculated using a bit by bit Exclusive OR function of corresponding data chunks in a stripe from all of the data disks. This corresponds to a one equation, one unknown, sum of products calculation. On the other hand, the Q parity is calculated linearly independent of P, but again using a different algorithm for sum of products calculation. As a result, each parity value is calculated using an independent algorithm and each is stored on a separate disk in the stripe set or redundancy group. Consequently, a RAID 6 system can rebuild data (assuming rebuild space is available) even in the event of a failure of two separate disks within a stripe set or redundancy group, whereas a RAID 5 system can rebuild data only in the event of no more than a single disk failure within a stripe set or redundancy group.

Similar to RAID 5, a RAID 6 architecture distributes the two parity blocks across all of the data storage devices in the stripe set or redundancy group. Thus, in a stripe set or redundancy group of N+2 data storage devices, each stripe has N blocks of data and two blocks of independent parity data. One of the blocks of parity data is stored in one of the N+2 data storage devices, and the other of the blocks of parity data is stored in another of the N+2 data storage devices. The parity blocks corresponding to the remaining stripes of the stripe set or redundancy group are stored across the data storage devices within the stripe set or redundancy group. For example, in a RAID 6 system using five data storage devices in a given stripe set or redundancy group, the parity blocks for the first stripe of blocks may be written to the fourth and fifth devices; the parity blocks for the second stripe of blocks may be written to the third and fourth devices; the parity blocks for the third stripe of blocks may be written to the second and third devices; etc. Typically, again, the location of the parity blocks for succeeding blocks shifts to the succeeding logical device in the stripe set or redundancy group, although other patterns may be used.

More information detailing the architecture and performance of RAID systems can be found in The RAID Book: *A Source Book for RAID Technology,* by the RAID Advisory Board, published Jun. 9, 1993, the disclosure of which is incorporated in full herein by reference. Additionally, a background discussion of RAID systems, and various ways to logically partition RAID systems, is found in U.S. Pat. No. 5,519,844 to David C. Stallmo, entitled "Logical Partitioning of a Redundant Array Storage System," incorporated in full herein by reference.

A hierarchical data storage system permits data to be stored according to one or more different techniques, such as different redundancy schemes, RAID levels, redundancy groups, or any combination of these. For example, in a hierarchical RAID system, data can be stored in one or more redundancy groups, and for each redundancy group, according to one or more RAID architectures (levels) to afford tradeoffs between the advantages and disadvantages of the redundancy techniques. For purposes of this disclosure, a hierarchical system includes: (1) one that automatically or dynamically migrates data between redundancy schemes (i.e., different RAID levels) and/or redundancy groups for optimum system tuning and performance, and (2) one that requires user input to configure redundancy schemes or groups, such as one that requires a user to designate a given RAID level with an identified set or subset of disks in a system array.

U.S. Pat. No. 5,392,244 to Jacobson et al., entitled "Memory Systems with Data Storage Redundancy Management", incorporated in full herein by reference, describes a hierarchical RAID system that enables data to be migrated from one RAID type to another RAID type as data storage conditions and space demands change. This patent describes a multi-level RAID architecture in which physical storage space is mapped into a RAID-level virtual storage space having mirror and parity RAID areas (e.g., RAID 1 and RAID 5). The RAID-level virtual storage space is then mapped into an application-level virtual storage space, which presents the storage space to the user as one large contiguously addressable space. During operation, as user storage demands change at the application-level virtual space, data can be migrated between the mirror and parity RAID areas at the RAID-level virtual space to accommodate the changes. For instance, data once stored according to mirror redundancy may be shifted and stored using parity redundancy, or vice versa.

With data migration, the administrator is afforded tremendous flexibility in defining operating conditions and establishing logical storage units (or LUNs). As one example, this type of RAID system can initially store user data according to the optimum performing RAID 1 configuration. As the user data approaches and exceeds 50% of a stripe set or redundancy group array capacity, the system can then begin storing data according to both RAID 1 and RAID 5, and dynamically migrating data between RAID 1 and RAID 5 in a continuous manner as storage demands change. At any one time during operation, the data might be stored as RAID 1 or RAID 5 or both on all of the disks. The mix of RAID 1 and RAID 5 storage changes dynamically with the data I/O and storage capacity. This allows the system to dynamically optimize performance and available capacity versus an increasing amount of user data.

Clearly, each RAID level has characteristic cost-performance and cost-capacity ratios. Importantly, however, RAID systems maintain and manage redundant data to enable a recovery of the data in the event of a storage disk or component failure. To this regard, each RAID level also has a characteristic availability that determines the mean time to data loss as a function of the number of disks employed, i.e., different RAID levels provide different degrees of data protection. In the event of a disk or component failure, redundant data is retrieved from the operable portion of the system and used to regenerate or rebuild the original data that is lost due to the component or disk failure. Specifically, when a disk in a RAID redundancy group fails, the array attempts to rebuild data on the surviving disks of the redundancy group (assuming space is available) in such a way that after the rebuild is finished, the redundancy group can once again withstand a disk failure without data loss. Depending upon system design, the rebuild may be automated or may require user input. Design factors that affect rebuild include, for example, whether a spare disk is specified in the array, or whether the failed disk must be manually replaced by a user.

After detecting a disk or component failure and during a rebuild of data, regardless of rebuild design, the system remains subject to yet further disk or component failures in the same stripe set or redundancy group before the rebuild is complete. In any RAID system, this is significant because the vulnerability of data loss is dependent upon the RAID architecture (redundancy scheme) employed for that data.

For example, consider a hierarchical RAID array that uses ten disks in a single redundancy group with RAID 1 and RAID 5 storage schemes, where each RAID level may be employed separately or jointly on any one or more of the disks. The RAID 5 storage includes a stripe of data of a single block size on each disk. Each of nine disks holds actual user data in its respective block of the stripe. The tenth disk holds a block of data in the stripe containing redundant (parity) information. If a disk fails, the data on the failed disk can be reconstructed from the data on the remaining nine disks. The original and reconstructed data can then be re-written across the nine remaining good disks in a new stripe (with one of those disks being designated as the parity disk for the new stripe). However, if any of the nine remaining disks fail before all of the RAID 5 data is rebuilt and re-written, then data will be lost.

For the RAID 1 storage of this example, data stored on a first of the 10 disks is mirrored only on a second disk in the array. If the first disk fails, then during rebuild from the second mirror disk, data will only be lost if the second mirror disk fails. Other disks could fail and the array would not lose the RAID 1 data, but RAID 5 data would be lost.

Therefore, in this example of RAID 1 and RAID 5 hierarchical storage, in the event of a disk failure and during a rebuild, the RAID 5 storage is more vulnerable, i.e., has a greater probability of data loss, than the RAID 1 storage. However, conventional hierarchical RAID systems rebuild data irrespective of the vulnerability of the RAID levels employed.

Accordingly, to minimize the probability of data loss during a rebuild in a hierarchical RAID system, there is a need to manage data recovery and rebuild that accounts for data availability characteristics of the hierarchical RAID levels employed.

SUMMARY OF THE INVENTION

According to principles of the present invention in a preferred embodiment, in a hierarchical data storage system employing data redundancy schemes, such as a RAID system, a method of managing data in response to a disk failure in the storage system includes prioritizing a data rebuild based on a most vulnerable data redundancy scheme identified in the storage system. Prioritizing the data rebuild includes enabling a rebuild of the most vulnerable data redundancy scheme prior to enabling a rebuild of any other data redundancy scheme in the system. The most vulnerable data redundancy scheme is determined by comparing a probability of losing data that can be prevented by a rebuild for each data redundancy scheme in the system with respect to the potential for one or more next disk failures in the data storage system. The probability of losing data for each data redundancy scheme is determined by considering characteristics associated with the storage system and storage devices in the array, such as number of storage devices, number of device failures, mean time between failure, mean time or calculated time to rebuild, and failure dependencies.

The present invention further includes a data storage system and apparatus embodying the rebuild prioritization method described.

Other objects, advantages, and capabilities of the present invention will become more apparent as the description proceeds.

DETAILED DESCRIPTION OF THE INVENTION

Figure 1:
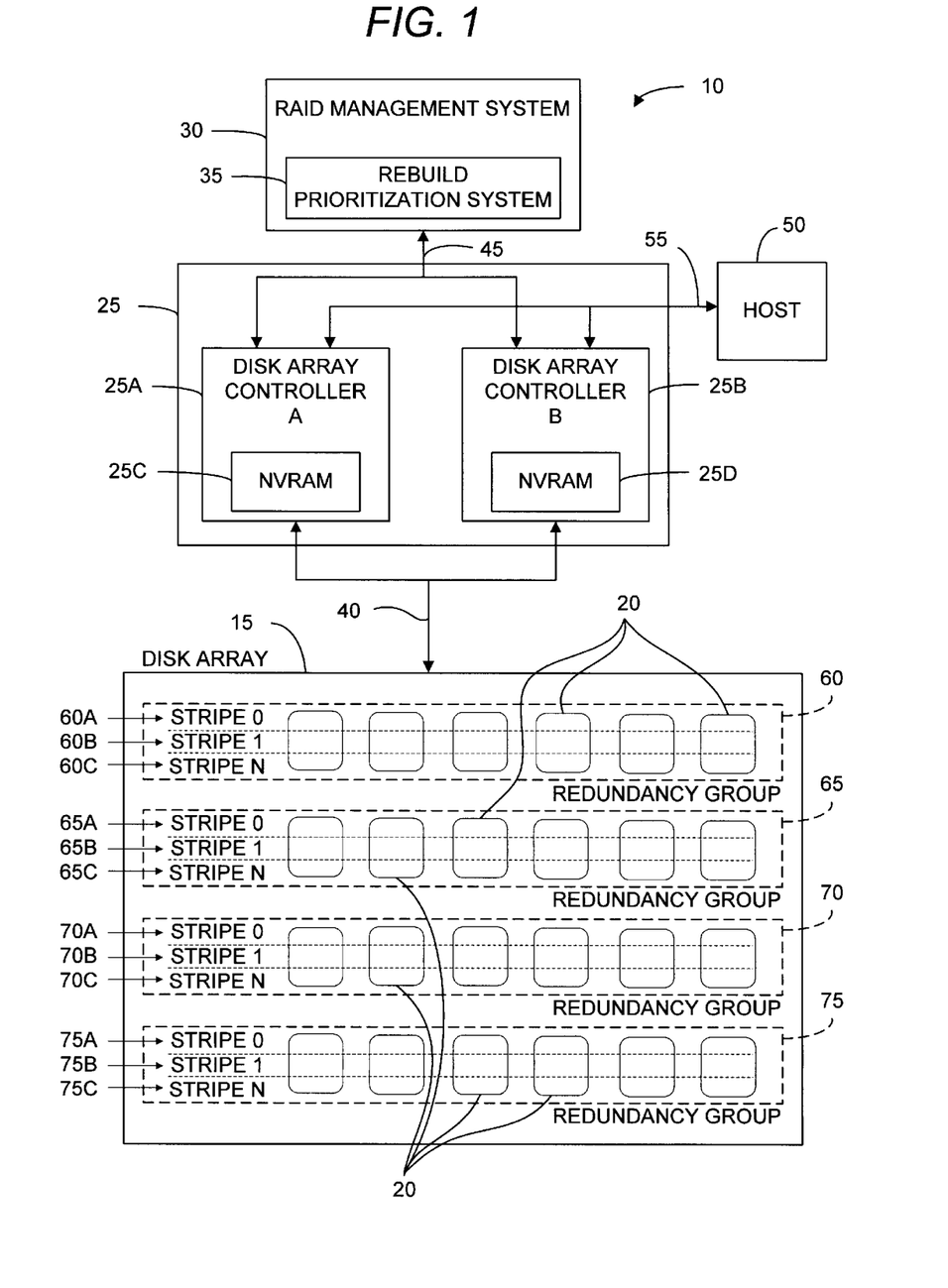
FIG. 1 is a block diagram of a hierarchical data storage system employing one embodiment of the present invention rebuild prioritazation system and method.

FIG. 1 is a block diagram of a hierarchical RAID data storage system 10 employing one embodiment of the present invention rebuild prioritization system 35 and method for prioritizing a data rebuild in the event of a disk failure, component failure or other system failure indicative of an inability to access certain data in the system. The data storage system 10 includes a disk array 15 having a plurality of storage disks 20, a disk array controller cluster 25 coupled to the disk array 15 to coordinate data transfer to and from the storage disks 20, and hierarchical RAID management system 30. The RAID management system 30 controls data storage and the hierarchical RAID levels (redundancy schemes) in the array 15, and controls the transferring of data among the various hierarchical redundancy schemes. Importantly, the RAID management system 30 includes a data rebuild prioritization system 35 according to the present invention. Specifically, in the event of a disk or component failure for any storage disk 20, the data rebuild prioritization system 35 minimizes potential data loss by prioritizing the rebuild according to the most vulnerable RAID level first.

For purposes of this disclosure, a "disk" is any non-volatile, randomly accessible, rewritable mass storage device. It includes both rotating magnetic and optical disks and solid-state disks, and non-volatile electronic storage elements (such as PROMs, EPROMs, and EEPROMs). The term "disk array" is a collection of disks, the hardware required to connect them to one or more host computers, and management software used to control the operation of the physical disks and present them as one or more virtual disks to the host operating environment. A "virtual disk" is an abstract entity realized in the disk array by the management software. A "storage device failure" or "disk failure" is defined to include any aspect, aspects, event or events of the system 10 or components that causes any one or more of the disks 20 to be inaccessible, or data on any one or more of the disks to be inaccessible. Exemplary disk failures include, an actual failure of the physical disk 20 itself, a system or component failure that affects read or write access to a disk or disks, an event or combination of events that cause a disk or disks to be inaccessible, or even a removal of a disk or disks from the array 15. An "array" is defined to include, in context, a set or a subset of storage devices.

The disk array controller cluster 25 is coupled to the disk array 15 via one or more interface buses 40, such as a small computer system interface (SCSI). The RAID management system 30 is operatively coupled to the disk array controller cluster 25 via an interface protocol 45. In the system shown, disk array controller cluster 25 is implemented as a dual controller consisting of disk array controller "A" 25A and disk array controller "B" 25B. Dual controllers 25A and 25B enhance reliability by providing continuous backup and redundancy in the event that one controller becomes inoperable. However, the present invention can be practiced with more than two controllers, a single controller or other architectures.

In a preferred embodiment, the RAID management system 30 and data rebuild prioritization system 35 are configured as firmware within a non-volatile random access memory (NVRAM) 25C, 25D of the disk array controller cluster 25. The RAID management system 30 and data rebuild prioritization system 35 include executable instructions, routines, tables and/or other data and data structures necessary for managing the controller cluster 25 and array 15, including rebuilding data after a disk failure, and for prioritizing and/or managing the order or sequence of rebuild under the present invention as will be discussed more fully herein. The RAID management system 30 and data rebuild prioritization system 35 are shown as separate from the controller cluster 25 simply for clarity of depiction and descriptions purposes. Alternatively, the RAID management system 30 and data rebuild prioritization system 35 are embodied as a separate component (as shown), either as firmware or software, or configured within a memory of a host computer 50. Alternatively, these systems are embodied in hardwired circuitry (such as an ASIC). The data storage system 10 is coupled to the host computer 50 via an I/O interface bus 55.

It should be noted here that this disclosure does not detail general RAID management techniques or actual data rebuild techniques in the event of a disk failure because these are already sufficiently well known and disclosed in the art. Rather, the present invention disclosure focuses on identifying implementations and methods for prioritizing and/or managing the order or sequence of rebuild of an array system employing multiple (hierarchical) data redundancy levels and/or redundancy groups. Additionally, although a RAID system is specifically shown and discussed, it will be understood that the present invention is applicable to any data redundancy schemes, techniques, groups or systems.

The hierarchical disk array 15 is characterized by different storage spaces, including its physical storage space and one or more virtual RAID level storage spaces. These views of storage are related through mapping techniques. Specifically, the physical storage space of the disk array 15 is mapped into a virtual storage space which delineates storage areas according to the various RAID data reliability levels (redundancy schemes). For example, the storage disks 20 in the disk array 15 can be conceptualized as being arranged into multiple redundancy groups 60, 65, 70, 75, each having a defined subset of the disks 20, with each redundancy group being configured into stripe sets having stripes 60A, 60B, 60C, 65A, 65B, 65C, 70A, 70B, 70C, and 75A, 75B, 75C. Four exemplary redundancy groups are shown 60, 65, 70, 75, each having stripes zero through "N", but any number of groups or stripes are feasible under the present invention.

At any given point in time, each stripe is allocated a specific RAID level redundancy scheme and each redundancy group includes one or more RAID levels in its stripe set. In a preferred embodiment, RAID management system 30 migrates the redundancy schemes among the stripes and redundancy groups, depending upon storage capacity, data reliability and performance needs. For example, at a given point in time, stripe 0 (60A) of redundancy group 60 may be designated as RAID level 1 mirror redundancy, and stripes 1 (60B) and N (60C) may be designated as RAID level 5 parity redundancy. On the other hand, an entire redundancy group 65 may be designated as RAID level 6, and the other redundancy groups 70 and 75 may be designated as any combination of single or multiple redundancy schemes, including RAID levels 2, 3, 4, 5 or 6. Importantly, as described, each of these RAID levels may be configured on the same or separate disks or any combination thereof, all within stripe sets or redundancy groups in the disk array 15.

The data storage system 10 includes a memory map store that provides for persistent storage of the virtual mapping information used to map the disk array 15. The memory map store is external to the disk array and, preferably, redundantly resident in a memory 25C and 25D of the disk array controller cluster 25. The memory mapping information can be continually or periodically updated by the controller cluster 25 or the RAID management system 30 as the various mapping configurations among the different views change.

As indicated, the disk array 15 has multiple storage disk drive devices 20, and the management of data redundancy on the devices 20 is coordinated by the RAID management system 30. When viewed by the user or host application program, an application-level virtual view can represent a single large storage capacity indicative of the available storage space on the storage disks 20 within the array 15. As mentioned, in a preferred embodiment, the RAID management system 30 dynamically alters the configuration of the RAID areas over the physical storage space. As a result, the mapping of the RAID areas in a RAID-level virtual view onto the disks and the mapping of a front end virtual view to the RAID view are generally in a state of change. The memory map store in memories 25C and 25D maintains the current mapping information used by the RAID management system 30 to map the RAID areas onto the disks, as well as the information employed to map between the virtual views. As the RAID management system dynamically alters the RAID level mappings, it also updates the mapping information in the memory map store to reflect the alterations.

Now, importantly, in the event of any disk failure relative to any one or more of the disks 20, the data rebuild prioritization system 35 of the present invention is activated to prioritize redundancy schemes (i.e., RAID levels) in the array 15 and enable a rebuild of the data in such a manner that potential data loss is minimized. Specifically, in response to a disk failure or multiple disk failures, the present invention prioritizes the redundancy schemes in each of the redundancy groups to enable a storage rebuild of the most vulnerable RAID level first, the second-most vulnerable RAID level next, and so forth. A most vulnerable redundancy scheme (i.e., RAID level) is defined as a redundancy scheme having the highest probability for potential data loss that can be prevented by a rebuild in the array 15 (relative to any other RAID levels within its redundancy group and relative to any other RAID levels within any other redundancy group in the array, all with respect to the potential for one or more next storage device failures in the array). Where a same redundancy scheme (i.e., RAID level) is employed in two or more separate redundancy groups, then a most vulnerable redundancy scheme may be defined relative to a given redundancy group.

Advantageously, this prioritization technique is applied to the array 15 regardless of the RAID levels or other data redundancy levels employed or that may be employed. The vulnerability is measured through the probability of losing data that can be prevented by a rebuild given that a disk or multiple disks 20 has/have failed. In a preferred embodiment, the data rebuild prioritization system 35 does not actually rebuild the data that is subject to the failure but, rather, identifies and prioritizes the order of rebuild so that the RAID management system 30 may perform the rebuild.

Due to the existence of multiple RAID levels on the same disk or disks 20 in a hierarchical architecture, or due to the existence of one or more RAID levels on one or more redundancy groups, enabling a rebuild of one RAID level over another by rebuild prioritization system 35 after a disk failure occurs may reduce exposure to subsequent disk failures that may actually lead to a loss of data. In this context, the order in which RAID levels are rebuilt may be critical because the probability of losing data may be reduced.

The order or sequence of rebuild is very dependent on the actual RAID levels that are supported by the disk storage system 10 and the sequence in which a disk failure or disk failures occur. Due to the huge number of combinations of disks failures, and the RAID levels that may co-exist on a given disk array 15 or set of disks 20, the following examples will demonstrate the rebuild order (prioritization) analysis and steps performed by the data rebuild prioritization system 35 according to a preferred embodiment.

First, assume that we have a set of N disks 20 in a single redundancy group (group 1) and, for simplicity, assume N is even. Additionally, assume that all of the N disks are configured in the following RAID levels:

RAID 1, where a portion of a disk is mirrored to another disk, and

RAID 6, where N−2 disks contain actual data, and two disks contain two independent parities (two extra redundancy information).

Again, it should be noted that these are not the only RAID levels that can be supported by this invention; but for the purpose of demonstration, we are limiting our example to the above RAID levels.

Next, let us define conditional probability P(x,y|z) as the probability of losing RAID x (or redundancy scheme) data in redundancy group y that can be prevented by rebuild, given that z disks in redundancy group y have been identified as failed. In mathematical terms $P(x,y|z)=Pr$ (losing RAID $x$ data in redundancy group $y$ that can be prevented by rebuild $|z$ disks in redundancy group $y$ have been identified as failed)

where $P(x,y|z)=0$, when $z=0$ (i.e., no disk failure in redundancy group $y$), or RAID $x$ data in redundancy group $y$ is already lost (i.e., cannot be prevented)

Because a rebuild by rebuild prioritization system 35 does not start until a disk or multiple disk failures are encountered, the above probabilities must be conditioned on disk failure. Thus, for a single redundancy group system (y=1):

P(1,1|1): Probability of losing RAID 1 data only in redundancy group 1 that can be prevented by rebuild given that one disk has failed in redundancy group 1; and P(6,1|1): Probability of losing RAID 6 data only in redundancy group 1 that can be prevented by rebuild given that one disk has failed in redundancy group 1.

Also, let MTBF correspond to disk Mean Time Between Failure, and MTTR correspond to Mean Time To Rebuild. The MTBF and MTTR characteristics are determined by conventional methods, such as using statistical samples, or obtained from disk manufacturer specifications. Although MTTR is used for this discussion, it will be understood that a calculated time to rebuild is also feasible and may be substituted for MTTR. Additionally, it is understood that the MTTR is RAID level dependent and system configuration dependent. However, for ease of discussion purposes, let us assume that the MTTR (that may include disk replacement time if no on-line spare is present) for any RAID level is constant. Also, let us assume that disk failures are random (and follow exponential distribution). Then, in this context, the steady state probability (limiting probability) of a given disk to fail during the rebuild time is calculated by:

$P$ (a given disk to fail during rebuild)=MTTR/MTBF

Given the forgoing, the following scenarios will now be analyzed:

Case 1: One disk failed

Case 2: Two disks failed, not mirror of each other in RAID 1

Case 3: Two disks failed, mirror of each other in RAID 1

Case 4: Three disks or more failed.

Case 1: RAID 1 and RAID 6; One Disk Failed

For Case 1, we have one disk failed, and if the next disk failure happens to be the mirror image of the failed disk in RAID 1 while the failed disk is still being rebuilt, then RAID 1 data loss will occur. It follows:

$P(1, 1|1) = P$ (Failure of a second disk during rebuild, the second disk being mirror to the first failed disk)

$= MTTR/MTBF$

On the other hand, if the next disk failure is not a mirror of the failed disk in RAID 1 (any disk, as long as it is not a mirror of the first failed disk, N−2 possible ways), then no data loss in RAID 6 will occur. It is only the failure of a third disk (any surviving disk, N−2 possible ways) that will cause the RAID 6 data loss. Thus, $P(6, 1|1) = P$ (Failure of any second disk during rebuild, not a mirror to first failed disk) $\times P$ (Failure of any third disk during rebuild, any surviving disk)

$= (N - 2)(MTTR/MTBF) \times (N - 2)(MTTR/MTBF)$ $= (N - 2)^2 MTTR^2 / MTBF^2$

Consequently, P(1,1|1) and P(6,1|1) are compared to determine which RAID level should be prioritized to be rebuilt first. Clearly, the higher the probability, the higher the priority for that RAID level to be rebuilt first. Accordingly, for most Case 1 scenarios, RAID 1 is the most vulnerable to potential data loss and thus will be prioritized to be rebuilt first. Notably, an exception exists to rebuild RAID 6 first when N becomes large. For example, RAID 6 is rebuilt first for this case study when:

$$N > 2 + \sqrt{\frac{MTBF}{MTTR}}$$

Case 2: RAID 1 and RAID 6; Two Disks Failed, not Mirror of Each Other

For Case 2, if the two disks that have failed are not a mirror of each other in RAID 1, then a next disk failure (any surviving disk, N−2 possible ways) during the rebuild will cause a data loss in RAID 6. Thus:

$P(6, 1|2) = P$ (any surviving disk to fail during rebuild)

$= (N - 2) MTTR/MTBF$

However, RAID 1 data can be lost too if it happens that the third disk failure is a mirror of one of the other two failed disks. The third disk must be a mirror of the first failed disk or a mirror of the second failed disk in RAID 1 (there are two possible ways), and the probability of losing RAID 1 data is:

$P(1, 1|2) = P$ (any of the mirror disks of the already failed disks to fail during rebuild)

-continued $$= 2\, MTTR/MTBF$$

Again, P(1,1|2) and P(6,1|2) are compared to determine which RAID level should be rebuilt first. The higher the probability, the higher the priority for that RAID level to be rebuilt first. Accordingly, for any Case 2 scenario where N>4, RAID 6 is the most vulnerable to potential data loss and thus will be prioritized to be rebuilt first for this case study.

Case 3: RAID 1 and RAID 6; Two Disks Failed, Mirror of Each Other

For Case 3, if the two failed disks are mirror of each other in RAID 1, we have already lost RAID 1 data on those two disks and, as such, rebuilding the lost data in RAID 1 is not possible. In this scenario, the only choice we have is to rebuild RAID 6 data. Thus, $P(1, 1|2) = 0$ (due to the fact that data in RAID 1 is already lost, and rebuild is impossible)

$P(6, 1|2) = P$ (any surviving disk to fail during rebuild)
$= (N - 2)\, MTTR/MTBF$ A comparison of P(1,1|2) and P(6,1|2) for Case 3 clearly indicates that the RAID 6 data is the most vulnerable to potential data loss because P(6,1|2) will always have the higher probability and thus the higher priority. In other words, we have no choice but to rebuild RAID 6 data. As such, in a Case 3 scenario, RAID 6 will always be rebuilt first.

Case 4: RAID 1 and RAID 6: Three Disks or More Failed

Finally for Case 4, if three disks or more have failed, then RAID 6 data is definitely lost, and the only data that may be rebuilt is in RAID 1 (if possible). In this case:

$P(6,1|z)=0$ for $z \geq 3$ (due to the fact that data in RAID 6 is already lost, and rebuild is impossible)

Clearly, for a Case 4 scenario, the only choice is to rebuild RAID 1 data when possible. As such, in a Case 4 scenario, RAID 1 will always be rebuilt first when possible.

Now, in summary, these Case examples have shown that for Case 3, we have no choice but to rebuild RAID 6, and for Case 4 the only choice is to rebuild RAID 1 when possible. On the other hand, decisions for Case 1 and Case 2 are dependent on MTTR, MTBF and N. As these numbers change (i.e.; faster repair time, faster rebuild time, longer time between failure, different number of disks supported in each redundancy group in the system) the strategy for rebuild priority may change accordingly. As an example, using generic numbers for demonstration purposes only, let us assume that:

MTBF is 1,000,000 hours (1.0E+6 hours),

MTTR is 24 hours, and

N is 10;

then,

For Case 1

$P(1,1|1)=MTTR/MTBF=24/1.0E+6=2.4\,E-5$ $P(6,1|1)=(N-2)^2 MTTR^2/MTBF^2=(10-2)^2 24^2/(1.0E+6)^2=3.7\,E-8$

And for Case 2

$P(1,1|2)=2\,MTTR/MTBF=2 \times 24/1.0E+6=4.8\,E-5$ $P(6,1|2)=(N-2)MTTR/MTBF=(10-2) \times 24/1.0E+6=1.9\,E-4$ This example shows again that for Case 1, we rebuild RAID 1 first. However, for Case 2 the rebuild strategy should focus on RAID 6 first.

Finally, consider the present invention rebuild prioritization system 35 in context of one more example of a hierarchical RAID array 15 that uses one redundancy group (group 1) having ten disks with RAID 1 and RAID 5 storage schemes (and not RAID 6), where each RAID level may be employed separately or jointly on any one or more of the disks in the array. The RAID 5 storage includes a stripe of data of a single block size on each disk. Each of nine of the disks holds actual user data in its respective block of the stripe. The tenth disk holds a block of data in the stripe containing redundant (parity) information. If a disk fails, the data on the failed disk can be reconstructed from the data on the remaining nine disks. The original and reconstructed data can then be re-written across the nine remaining good disks in a new stripe (with one of those disks being designated as the parity disk). However, if any of the nine remaining disks fail before all of the RAID 5 data is rebuilt and re-written, then data will be lost.

Figure 2:
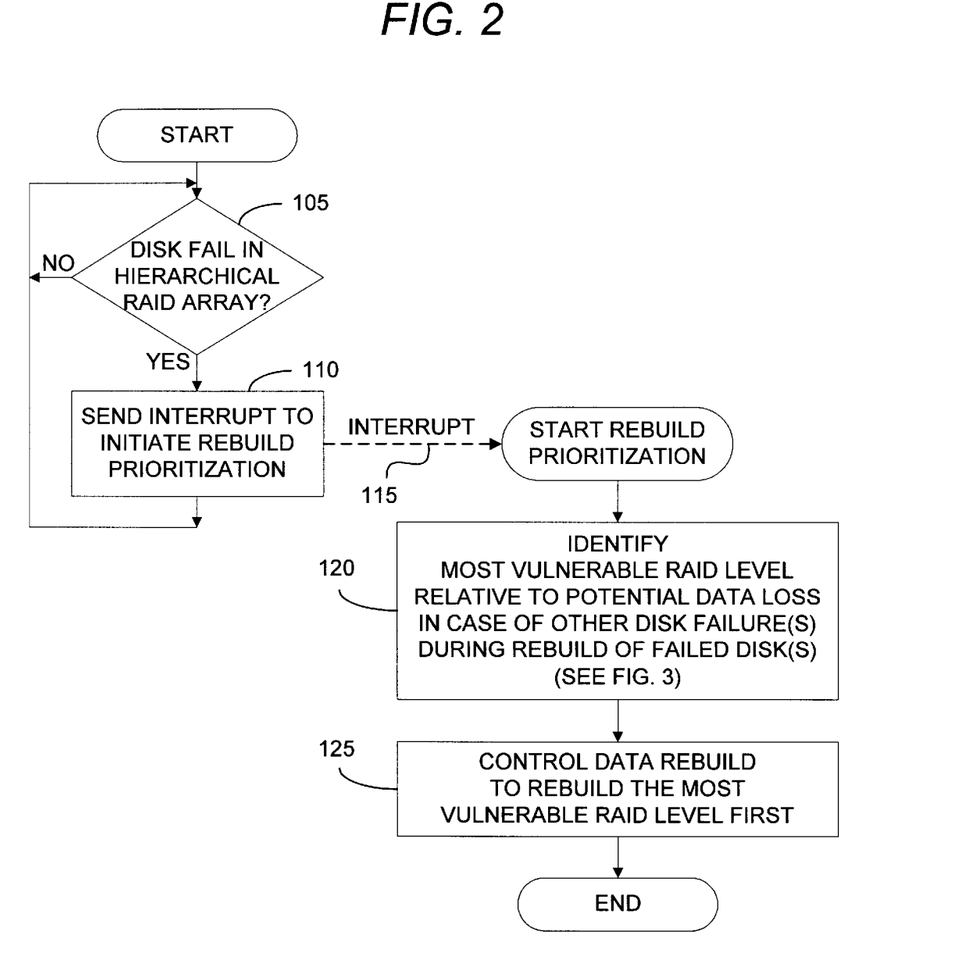
FIG. 2 is a flow chart depicting a preferred method of the present invention.

For the RAID 1 storage of this example, data stored on a first of the ten disks is mirrored only on a second disk in the array. If the first disk fails, then during rebuild from the second (mirror) disk, data will only be lost if the second disk fails. Other disks could fail and the array would not lose data in RAID 1, but would lose data in RAID 5. Therefore, in this example of RAID 1 and RAID 5 hierarchical storage, in the event of a disk failure and during a rebuild, the RAID 5 storage has a greater probability of data loss than does the RAID 1 storage. Thus, the rebuild prioritization system 35 will cause RAID 5 data to be rebuilt first. The probabilities for this example are as follows:

$P(1, 1|1) = P$ (Failure of second disk during rebuild, the second disk being a mirror to the first failed disk)
$= MTTR/MTBF$ $P(5, 1|1) = P$ (Failure of any second disk during rebuild, not a mirror to first failed disk)
$= (N - 2)(MTTR/MTBF)$ Referring now to FIG. 2 and FIG. 3, these flow charts depict a preferred method of the present invention and will be discussed in reference with FIG. 1. FIG. 2 depicts a preferred method from an overall, high level perspective, as embodied in two independently executing processes associated with rebuild prioritization system 35. Namely, when a disk failure is detected 105 in a hierarchical RAID data storage system 10, an interrupt is sent 110, 115 to initiate rebuild prioritization processing. Upon interrupt initiation 115, the present invention rebuild prioritization system 35 identifies 120 the most vulnerable RAID level in the array 15 relative to potential data loss with respect to the possibility of any further disk failure(s) during rebuild. Subsequently, upon identifying the most vulnerable RAID level, the rebuild prioritization system 35 communicates 125 with RAID management system 30 to enable, cause, or control RAID management system 30 to rebuild data of the failed disk by rebuilding the identified most vulnerable RAID level first. In this manner, importantly, minimizing the probability of data loss to the array 15 may be achieved. Additionally, the array's overall availability may be increased.

It should be noted here that if a next disk failure detection occurs 105 during a rebuild (i.e., during an already existing disk failure), the present invention rebuild prioritization system 35 again sends an interrupt 110, 115 to recalculate the rebuild prioritization 120 and enable or control a newly prioritized rebuild 125. In response, RAID management system 30 acknowledges any newly calculated rebuild prioritization determined, holds any currently executing rebuild, and then initiates and completes rebuild based on the newly calculated information. In a preferred embodiment, this rebuild prioritization processing is interrupt driven 110, 115 in order to identify the most vulnerable RAID level at any point in time and given any set of system changes or circumstances, even during an executing prioritization determination or data rebuild. For example, if a rebuild prioritization is occurring in response to a first disk failure in redundancy group 60 (FIG. 1), and a next disk failure actually occurs either in the same redundancy group or in a separate redundancy group, then an interrupt signal 115 is sent to re-initiate prioritization 120 and to identify a newly calculated most vulnerable RAID level and to enable the rebuild to occur based on the newly calculated most vulnerable RAID level.

Figure 3:
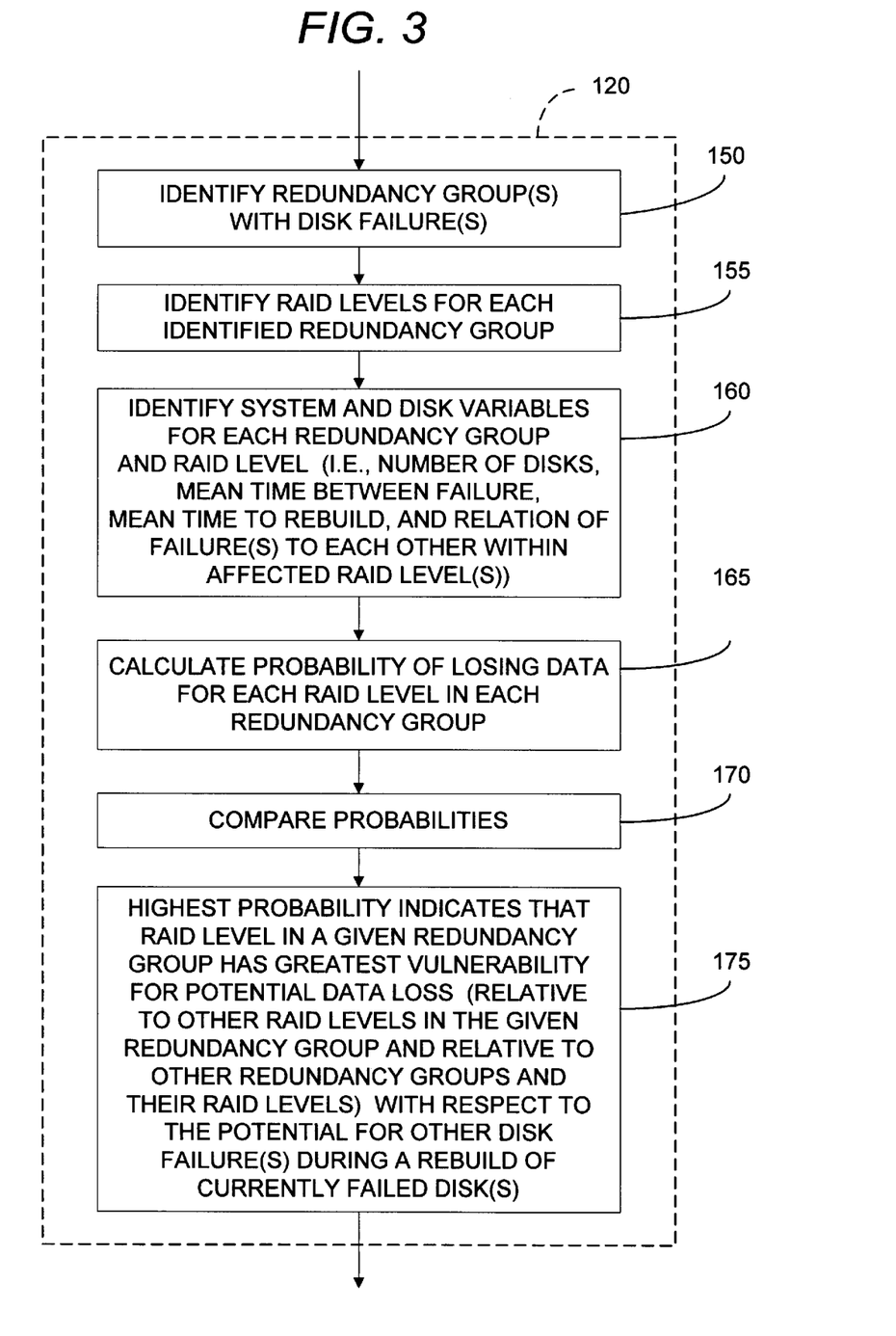
FIG. 3 is a flow chart depicting further detail of a step identified in the method of FIG. 2.

FIG. 3 depicts further details of step 120 of FIG. 2. To identify the most vulnerable RAID level 120, characteristics associated with the storage system 10, 15 and storage devices 20 in the array are considered, including number of storage devices in each redundancy group, number of device failures, mean time between failure, mean time to rebuild, and failure dependencies. Failure dependencies include the location of the failure(s) with respect to redundancy group(s), which redundancy scheme(s) are affected by the failure(s) in the redundancy group(s), and the relation of the failure(s) to each other within the affected redundancy scheme(s).

The first step is to identify 150 any redundancy group(s) 60, 65, 70 or 75 in the array. Next, 155, the RAID level(s) employed by each redundancy group is/are identified. For example, are RAID 1 and RAID 6 being used in a single redundancy group, or only RAID 1 in one redundancy group and only RAID 5 in a separate redundancy group, or only RAID 1 in separate redundancy groups, or some other combination of RAID levels and redundancy groups?

Next, storage device and system variables are identified 160 for each redundancy group and RAID level. These variables include, for example, the number of disks (N) in the stripe set or redundancy group(s), mean time between failure (MTBF), mean time to rebuild (MTTR), and the relation of the failure(s) to each other within the affected redundancy scheme(s).

Subsequently, 165, the probability of losing data (with respect to the potential for one or more next storage device failures in the data storage system) is calculated for each RAID level in each redundancy group. See the discussion of FIG. 1 for more specific examples of calculating probabilities. Then, the calculated probabilities are compared 170. Finally, 175, the comparison dictates that the RAID level with the highest probability is the RAID level that has the greatest vulnerability for potential data loss (relative to other RAID levels in the given redundancy group and relative to other redundancy groups and their RAID levels) with respect to the potential for one or more next storage device failures during a rebuild of the currently failed disk.

It should be noted that in a preferred embodiment, the rebuild prioritization system 35 of the present invention includes hard coded instructions and data for identifying the most vulnerable RAID level. In other words, in any given initially manufactured storage system 10, the maximum number of disks 20 in each redundancy group are known in advance, and their MTBF and MTTR values are also known. Additionally, the hierarchical RAID levels implemented are also known and limited in advance. Thus, all possible disk failure scenarios are known and, as such, the most vulnerable RAID levels given the different possible disk failure scenarios are also known in advance (can be compared or calculated in advance based on conditions). Accordingly, in a preferred embodiment, upon detection of a need to rebuild after a disk failure, the rebuild prioritization system 35 simply executes branching instructions based on previously compared or calculated probabilities that meet the disk failure conditions to quickly identify and enable RAID management system 30 to perform a rebuild upon the most vulnerable RAID level first.

Alternatively, rebuild prioritization system 35 includes data, tables or structures that define and identify storage system 10 in such detail that a most vulnerable RAID level is detected dynamically. In other words, the number of disks 20 in the system 10 are dynamically determined during any array uptime, the types of disks and their MTBF values are stored in memory (such as in a read only memory) for dynamic look-up accessability, and the MTTR values and RAID levels currently employed are dynamically calculated or determined. With these factors being dynamically obtained, rebuild prioritization system 35 literally calculates on-the-fly the most vulnerable RAID level so that it can be prioritized and rebuilt first and reports the same to RAID management system 30.

Finally, what has been described above are preferred embodiments for a storage management and data rebuild prioritization system for a hierarchical RAID array. It will be obvious to one of ordinary skill in the art that the present invention is easily implemented utilizing any of a variety of hardware platforms and software tools existing in the art. While the present invention has been described by reference to specific embodiments, it will be apparent that other alternative embodiments and methods of implementation or modification may be employed without departing from the true spirit and scope of the invention.

What is claimed is:

1. A method of managing data in a hierarchical data storage system employing data redundancy schemes, the method comprising: in response to a storage device failure in the data storage system, controlling a data rebuild based on a most vulnerable data redundancy scheme in the storage system, wherein the most vulnerable data redundancy scheme is defined as a data redundancy scheme having a highest probability of losing data that can be prevented by a rebuild with respect to the potential for one or more next storage device failures in the data storage system.

2. The method of claim 1 wherein the data redundancy schemes include RAID levels.

3. The method of claim 1 wherein the hierarchical data storage system includes one or more data redundancy schemes employed within one or more redundancy groups in the data storage system, and wherein the most vulnerable data redundancy scheme identifies a redundancy scheme within a single redundancy group in comparison to the one or more redundancy schemes and one or more redundancy groups.

4. The method of claim 1 wherein controlling the data rebuild includes prioritizing the redundancy schemes and enabling a rebuild of the most vulnerable data redundancy scheme prior to enabling a rebuild of any other data redundancy scheme in the storage system.

5. The method of claim 1 wherein controlling the data rebuild includes identifying the most vulnerable data redundancy scheme by comparing a probability of losing data for each data redundancy scheme in the storage system with respect to the potential for one or more next storage device failures in the data storage system.

6. The method of claim 1 wherein controlling the data rebuild includes identifying the most vulnerable data redundancy scheme by considering characteristics associated with the data storage system, including at least a subset of the storage devices.

7. The method of claim 6 wherein the characteristics include indicia indicative of at least one of: a quantity of the storage devices, mean time between failure, mean time or calculated time to rebuild, number of failed storage devices and their relations to each other within the redundancy schemes used.

8. A method of reducing probability of data loss in a hierarchical data storage system having mass storage devices and data redundancy schemes, the method comprising:
   (a) detecting a storage device failure in the data storage system, the failure rendering data inaccessible relative to at least one of the mass storage devices;
   (b) identifying a data redundancy scheme having a highest probability of losing data that can be prevented by a rebuild with respect to the potential for one or more next storage device failures in the data storage system; and,
   (c) enabling a data rebuild to occur such that the data redundancy scheme having the highest probability of losing data is rebuilt first.

9. The method of claim 8 wherein identifying the data redundancy scheme having a highest probability of losing data includes comparing a probability of losing data for each data redundancy scheme with respect to the potential for one or more next storage device failures in the data storage system.

10. The method of claim 8 wherein identifying the data redundancy scheme having a highest probability of losing data includes considering characteristics associated with the data storage system, including at least a subset of the mass storage devices.

11. The method of claim 10 wherein the characteristics include indicia indicative of at least one of: a quantity of the storage devices, mean time between failure, mean time or calculated time to rebuild, number of failed storage devices and their relations to each other within the redundancy schemes used.

12. The method of claim 8 wherein detecting a failure occurs independent of identifying a data redundancy scheme.

13. A hierarchical data storage system, comprising:
   (a) data redundancy schemes;
   (b) failure detection apparatus configured to detect a failure of a storage device or devices in the storage system; and,
   (c) rebuild prioritization apparatus configured to enable a rebuild of data based on a most vulnerable data redundancy scheme in the storage system, wherein the most vulnerable data redundancy scheme is defined as a data redundancy scheme having a highest probability of losing data that can be prevented by a rebuild with respect to the potential for one or more next storage device failures in the data storage system.

14. The data storage system of claim 13 wherein the data redundancy schemes include RAID levels.

15. The data storage system of claim 13 wherein the failure detection apparatus is configured to detect that data is inaccessible relative to at least one of the storage devices.

16. The data storage system of claim 13 wherein the rebuild prioritization apparatus is configured to enable a rebuild of the most vulnerable data redundancy scheme prior to enabling a rebuild of any other data redundancy scheme in the storage system.

17. The data storage system of claim 13 wherein the rebuild prioritization apparatus is configured to enable a rebuild of data based on a most vulnerable data redundancy scheme by considering characteristics associated with the data storage system, including at least a subset of the storage devices.

18. A computer-readable medium having computer-executable instructions for controlling a data rebuild in a hierarchical data storage system having data redundancy schemes, the data rebuild being based on a most vulnerable data redundancy scheme in the storage system, wherein the most vulnerable data redundancy scheme is defined as a data redundancy scheme having a highest probability of losing data that can be prevented by a rebuild with respect to the potential for one or more next storage device failures in the data storage system.

19. A method of managing data in a hierarchical data storage system employing data redundancy schemes, the method comprising: in response to a storage device failure in the data storage system, controlling a data rebuild based on a most vulnerable data redundancy scheme in the storage system, wherein the hierarchical data storage system includes one or more data redundancy schemes employed within one or more redundancy groups in the data storage system, and wherein the most vulnerable data redundancy scheme identifies a redundancy scheme within a single redundancy group in comparison to the one or more redundancy schemes and one or more redundancy groups.

20. A method of managing data in a hierarchical data storage system employing data redundancy schemes, the method comprising: in response to a storage device failure in the data storage system, controlling a data rebuild based on a most vulnerable data redundancy scheme in the storage system, wherein controlling the data rebuild includes identifying the most vulnerable data redundancy scheme by comparing a probability of losing data for each data redundancy scheme in the storage system with respect to the potential for one or more next storage device failures in the data storage system.

21. A method of managing data in a hierarchical data storage system employing data redundancy schemes, the method comprising: in response to a storage device failure in the data storage system, controlling a data rebuild based on a most vulnerable data redundancy scheme in the storage system identified by considering characteristics associated with the data storage system, including at least a subset of the storage devices.

22. A hierarchical data storage system, comprising:
   (a). data redundancy schemes;
   (b) failure detection apparatus configured to detect a failure of a storage device or devices in the storage system; and,
   (c) rebuild prioritization apparatus configured to enable a rebuild of data based on a most vulnerable data redundancy scheme in the storage system by considering characteristics associated with the data storage system, including at least a subset of the storage devices.

23. A computer-readable medium having computer-executable instructions for controlling a data rebuild in a hierarchical data storage system having one or more data redundancy schemes, the data rebuild being based on a most vulnerable data redundancy scheme in the storage system, wherein the one or more data redundancy schemes are employed within one or more redundancy groups in the data storage system, and wherein the most vulnerable data redundancy scheme identifies a redundancy scheme within a single redundancy group in comparison to the one or more redundancy schemes and one or more redundancy groups.

24. A computer-readable medium having computer-executable instructions for controlling a data rebuild in a hierarchical data storage system having data redundancy schemes, the data rebuild being based on a most vulnerable data redundancy scheme in the storage system identified by considering characteristics associated with the data storage system, including at least a subset of the storage devices.

* * * * *